United States Patent
Kuwabara et al.

(10) Patent No.: US 6,600,536 B1
(45) Date of Patent: Jul. 29, 2003

(54) REFLECTION TYPE LIQUID CRYSTAL DISPLAY APPARATUS WITH INSULATING FILM BETWEEN ELECTRODES AND REFLECTION LAYER

(75) Inventors: Kazuhiro Kuwabara, Hitachi (JP); Shinichi Komura, Hitachi (JP); Osamu Itou, Hitachi (JP); Katsuyuki Funahata, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/535,976

(22) Filed: Mar. 27, 2000

(30) Foreign Application Priority Data

Mar. 31, 1999 (JP) ............................................. 11-092414

(51) Int. Cl.$^7$ ........................... G02F 1/1335; G02F 1/13
(52) U.S. Cl. ....................... 349/117; 349/112; 349/113; 349/119; 349/178; 430/7
(58) Field of Search ................................. 349/113, 117, 349/119, 178, 112; 430/7

(56) References Cited

U.S. PATENT DOCUMENTS

| | | | | | |
|---|---|---|---|---|---|
| 5,724,112 A | * | 3/1998 | Yoshida et al. | ............. | 349/119 |
| 5,745,204 A | * | 4/1998 | Hoshino | ..................... | 349/117 |
| 6,016,178 A | * | 1/2000 | Kataoka et al. | ............. | 349/117 |
| 6,130,735 A | * | 10/2000 | Hatanaka et al. | ........... | 349/113 |
| 6,133,970 A | * | 10/2000 | Hirakata et al. | ............... | 349/75 |
| 6,137,630 A | * | 10/2000 | Tsou et al. | ................... | 359/586 |
| 6,172,726 B1 | * | 1/2001 | Matsute et al. | ............. | 349/178 |
| 6,219,120 B1 | * | 4/2001 | Sasaki et al. | ................ | 349/113 |
| 6,259,499 B1 | * | 7/2001 | Yamanashi et al. | .......... | 349/113 |
| 6,300,990 B1 | * | 10/2001 | Yamaguchi et al. | ......... | 349/112 |
| 6,383,694 B1 | * | 5/2002 | Wu et al. | ....................... | 430/7 |
| 2002/0005925 A1 | * | 1/2002 | Arakawa | ..................... | 349/117 |

* cited by examiner

Primary Examiner—Julie Ngo
(74) Attorney, Agent, or Firm—Antonelli, Terry, Stout & Kraus, LLP

(57) ABSTRACT

A reflection type liquid crystal display apparatus can avoid degradation of a reflection surface or an electrode terminal, provide a multiple color display with high color purity, and reduce fluctuation of voltage due to loss of a drive voltage or capacitive coupling, even when a color filter is provided on a substrate on the side of a reflection plate, thereby to realize a bright display having a high contrast. The reflection type liquid crystal display apparatus has a pair of substrates, a pair of orientation films disposed between the pair of substrates, a liquid crystal layer disposed between the pair of orientation films, a plurality of electrodes disposed respectively opposing the substrates and the orientation films, a reflection layer disposed between a plurality of the electrodes and the substrates within a space defined between one of the substrates and one of the orientation films, and at least one or more thin films having an insulating property arranged between the plurality of electrodes and the reflection layer.

14 Claims, 9 Drawing Sheets

REFLECTION TYPE LIQUID CRYSTAL DISPLAY APPARATUS WITH INSULATING FILM BETWEEN ELECTRODES AND REFLECTION LAYER

BACKGROUND OF THE INVENTION

The present invention relates generally to a display apparatus. More particularly, the invention relates to a reflection type liquid crystal display apparatus for producing a color display having a high brightness, a high contrast and a high color purity without employing a back-light, by using external light, such as natural light, indoor light or the like.

As disclosed in Japanese Patent Application Laid-Open No. Heisei 9 (1997)-258219, Japanese Patent Application Laid-open No. Heisei 10 (1998)-161110, for example, the conventional reflection type liquid crystal display apparatus employing a single polarizing plate has a structure in which a pair of substrates formed with electrodes and orientation films, respectively, are arranged in opposition to each other and a liquid crystal layer is disposed between the substrates. One of the electrode is a reflecting electrode which serves as a reflection plate.

On the other hand, as disclosed in Japanese Patent Application Laid-Open No. Heisei 8 (1996)-166585, an electrode substrate on the side of the reflection plate is formed by providing a color filter and a flattening layer on a metal reflection plate, with a transparent electrode being formed thereover.

In the foregoing publications, both the reflection electrode and the reflection plate are formed with a thin metal film. Since the thin metal film has a low chemical strength and a low mechanical strength, it is easily oxidized or vulcanized, resulting in a lower reflectivity, and it is easily scratched. Accordingly, in the reflection electrode structure formed of an aluminum thin film, in which the electrode serves as a reflection plate, the surface of the aluminum thin film (reflection surface) inherently contacts the photosensitive resin, developer fluid, photosensitive resin peeling liquid, washing liquid (purified water) and the like during manufacture, to cause lowering of the reflectivity due to oxidization or corrosion of the surface in a process of patterning the aluminum thin film into the shape required for each electrode by way of a photolithographic process.

Furthermore, in the construction where the electrode serves as a reflection plate, the surface of the aluminum thin film which provides the reflection surface is exposed until the orientation film is formed. Therefore, the reflection surface inherently contacts the air to cause oxidization which will lower the reflectivity. Also, it is possible to scratch the reflection surface during the fabrication process, thereby lowering the process yield.

An aluminum terminal of the reflection electrode extended outside of a liquid crystal cell and exposed therefrom has a low mechanical strength and is easily oxidized or corroded, causing a difficulty in connecting with a tape carrier package (hereinafter referred to as TCP) mounting a liquid crystal driving IC or in peeling off the TCP for correction. Furthermore, it is also possible to cause an increase in the connection resistance or to cause a connection failure or display failure due to fluctuation.

In a construction where the transparent electrode is formed on the metallic reflection plate via the color filter and the flattening layer, since the color filter and the flattening layer are dielectric substances, viewed as an electric circuit, they form a capacitor structure. In this construction, since the reflection electrode is formed over the entire surface of the substrate, a structure is provided in which respective transparent electrodes are connected by capacitors. Therefore, the predetermined liquid crystal driving voltage applied to each transparent electrode may fluctuate due to capacitive coupling, thereby to cause degradation of the display quality.

On the other hand, since the color filter is directly formed on the metallic reflection plate, the surface of the metallic reflection plate (reflection surface) contacts the developer fluid, the washing liquid (pure water or the like) and so on to lower reflectivity due to oxidization or corrosion of the surface in the process for forming the color filter by way of photolithographic processing.

Furthermore, in case of a reflection type liquid crystal display apparatus employing a diffuse reflection electrode which is formed with an irregularity on the surface of the reflection electrode, since large number of irregularities will be present on the surface of the electrode within one pixel, the thickness of the liquid crystal layer (thickness of the liquid crystal layer between the substrates arranged in opposition) becomes non-uniform so as to cause a non-uniformity of the threshold voltage of the liquid crystal within the pixel, resulting in disturbance of the orientation of the liquid crystal molecule and a lowering of the contrast of the display.

In the reflection type liquid crystal display apparatus employing a diffuse reflection electrode, a gap between the substrates arranged in opposition across the liquid crystal layer is restricted by spacer beads. However, due to the irregularity on the reflection electrode, a difficulty is encountered in restricting the gap between the substrates with high precision, resulting in a non-uniformity of display or a lowering of the contrast.

In the reflection type liquid crystal display apparatus for color display employing a color filter, a multi-color display by tone control becomes possible. However, since an optical compensation by the liquid crystal and a phase difference film is not optimized, a monochrome display with good achromatic color cannot be obtained, and, thus, a color display with high color purity becomes difficult.

Furthermore, in the construction of the reflection electrode, where a display electrode serves as the reflection plate, when the color filter is provided on the substrate on the side of the reflection plate, the color filter is provided on the reflection electrode. Then, the voltage applied between the electrode arranged in opposition across the liquid crystal layer it, divided by the liquid crystal layer, the color filter and the orientation control layer so as to cause an elevating of the drive voltage.

SUMMARY OF THE INVENTION

The present invention has been developed in view of the problems set forth above. Therefore, it is an object of the present invention to provide a reflection type liquid crystal display apparatus which does not cause degradation of a reflection surface or an electrode terminal, provides a multiple color display with a high color purity, and reduces fluctuation of the voltage caused by loss of a drive voltage or capacitive coupling even when a color filter is provided on the substrate on the side of the reflection plate, thereby to realize a bright display having a high contrast.

According to one aspect of the present invention, a reflection type liquid crystal display apparatus comprises: a pair of substrates; a pair of orientation films disposed between the pair of substrates; a liquid crystal layer disposed between the pair of orientation films; a plurality of electrodes disposed respectively opposing the substrates and the orientation films; a reflection layer disposed between a plurality of the electrodes and the substrates within a space defined between one of the substrates and one of the orientation films; and at least one or more thin films having an insulating property arranged between the plurality of the electrodes and the reflection layer.

In the construction set forth above, a plurality of signal electrodes may be arranged on at least one substrate at an end portion thereof.

The reflection surface of the reflection layer may be a mirror surface.

The reflection layer may be a diffuse reflection surface having an irregularity on the surface thereof, the thin film having an insulating property serving as a flattening layer.

The reflection type liquid crystal display apparatus may further comprise a color filter disposed between the substrate and the orientation film.

The thin film having an insulating property may be formed with at least one of a reflection enhancing film consisting of two or more and no more than ten laminated dielectric films of an optical thickness of substantially one fourth wavelength, in which a dielectric film having a low refraction index and a dielectric film having a high refraction index are laminated alternately, a color filter, an insulation layer and a flattening layer.

The reflection type liquid crystal display apparatus may further comprise a black matrix arranged between pixels and peripheral portions of display regions within a space between the substrate and the orientation film arranged in opposition.

The reflection type liquid crystal display apparatus may further comprise a first birefringent film, a second birefringent film and a polarizing film arranged outside of the pair of substrates,
  the liquid crystal layer may be formed of a nematic liquid having crystal a twist angle within a range of greater than or equal to 220° and smaller than or equal to 270°,
  a product of the anisotropy of the refraction index of the liquid crystal layer and a thickness of the liquid crystal layer is preferable in a range of greater than or equal to 0.74 μm and less than or equal to 0.82 μm, a product of the anisotropy Δn of the refraction index of the first birefringent film and the thickness thereof d is preferably in a range of greater than or equal to 160 nm and less than or equal to 220 nm, and a product of the anisotropy of the second birefringent film and the thickness thereof is preferably in a range of greater than or equal to 370 nm and less than or equal to 470 nm, and
  with respect to a predetermined reference axis,
  an angle of an absorption axis of the polarizing film is preferably greater than or equal to 120° and less than or equal to 170°,
  an angle of a lag axis of the first birefringent film is preferably less than or equal to 700 and less than or equal to 90°, and
  an angle of a lag axis of the second birefringent film is preferably greater than or equal to 100° and less than or equal to 140°.

The angle of the absorption axis of the polarizing film may be set at an angle of a transmission axis of the polarizing film.

The reflection type liquid crystal display apparatus may further comprise a light scattering layer disposed in at least one of an interlayer portion, in which the first and second birefringent films and the polarizing film are laminated.

The light scattering layer is formed by laminating from one to four light scattering layers.

The light scattering layer is formed by laminating light scattering layers having the same scattering characteristics or by laminating from two to four kinds of mutually distinct light scattering layers.

The reflection type liquid crystal display apparatus may further comprise a plurality of column like spacers for maintaining a gap for the liquid crystal layer.

According to the present invention, since the thin film having an insulating property is provided between the reflection layer and the transparent electrode, the an insulating thin film serves as a surface protection layer for the reflection layer to prevent the reflection surface from being scratched, oxidized or corroded so as to maintain high reflectivity. Also, since the electrode terminal connecting a TCP is formed with a transparent electrode which has a higher chemical strength than the metallic electrode, oxidation and corrosion of the surface of the electrode terminal can also be prevented to eliminate the possibility of occurrence of a connection failure due to an increase or fluctuation of the connection resistance of the TCP. Furthermore, the transparent electrode has a higher mechanical strength than the metallic electrode, so as to reduce the possibility of peeling of the layer or breakage upon peeling or re-connection of the TCP to facilitate correction, thereby to contribute to improvement of the production yield.

On the other hand, since the reflection layer is provided with a mirror surface as the reflection surface, the transparent electrode and the orientation film provided on the reflection layer via the insulating thin film may have a flat surface so as to make the thickness of the liquid crystal in the pixel uniform, thereby to avoid variation of the threshold voltage or fluctuation of the orientation so as to provides a high contrast display.

Also, the insulating thin film may prevent shorting or leakage between the reflection layer and the transparent electrode even when the reflection layer is formed of a conductive material, such as a metal, and serves to reduce variation of the liquid crystal driving voltage due to capacitive coupling formed between the reflection layer and the transparent electrode, thereby to prevent degradation of the display quality.

Even when the reflection layer is a diffuse reflection electrode having an irregularity on the surface, the insulating thin film serving as the flattening layer may successfully absorb or accommodate the irregularity on the surface of the reflection layer. Therefore, the surface of the transparent electrode and the orientation film formed over the reflection layer via the insulating thin film can be flat so as to make the thickness of the liquid crystal in the pixel uniform to avoid variation of the threshold voltage or fluctuation of the orientation, whereby a high contrast display is produced.

Furthermore, by providing the color filter, a multiple color display with high color purity can be realized.

Also, since the reflection enhancing film is provided on the reflection layer, a higher reflectivity is achieved than that obtained when the reflection layer is solely applied, thereby to produce a bright display.

Furthermore, even when the color filter is formed between the reflection layer and the transparent electrode, since the transparent electrode provided on the upper layer of the color filter contacts the liquid crystal layer across the orientation film, loss of voltage to be applied to the liquid crystal can be avoided even when the color filter is provided on the reflection layer side substrate. Therefore, the liquid crystal can be driven without causing an increase of the driving voltage.

Furthermore, by providing a black matrix between the pixels in the peripheral portion of the display region on the substrate, unnecessary reflection light from a non-display portion can be avoided, thereby to enable a color display with a high color purity and a high contrast.

Also, by optimizing the condition of the liquid crystal, the first birefringent film, the second birefringent film and the polarizing film, an achromatic black display and a white display can be obtained to produce a color display with a high color purity.

By providing the light scattering layer, a display with a natural view angle and without imprinting can be realized even when the reflection layer has a mirror surface.

Also, by combining the light scattering layers, a wide variety of view angle characteristics can be realized even with the same structure of liquid crystal display element.

Furthermore, by providing the column like spacers in the non-display portion, the gap between the substrates can be maintained at a high precision, thereby to realize a uniform display quality without fluctuation.

More particular features, advantages and effects of the present invention will become apparent from the following detailed description presented with reference preferred embodiment. It should be noted that the features, advantages and effects set forth above may be equally achieved by modification, application and combination of features discussed with reference to the particular embodiments.

BRIEF DESCRIPTION OF THE DRAWINGS

The present invention will be understood more fully from the detailed description given hereinafter with reference to the accompanying drawings, which illustrate various preferred embodiments of the present invention; however, the embodiments should not be taken to be limitative to the present invention, but only as examples for explanation and understanding of the invention.

In the drawings.

DESCRIPTION OF THE PREFERRED EMBODIMENT

The present invention will be discussed hereinafter in detail in terms of the preferred embodiments of a reflection type liquid crystal display apparatus according to the present invention with reference to the accompanying drawings. In the following description, numerous specific details are set forth in order to provide a thorough understanding of the present invention. It will be obvious, however, to those skilled in the art, that the present invention may be practiced without these specific details. In addition, well-known structural features are not shown in detail in order to avoid unnecessary obscurity of the present invention.

Figure 1:
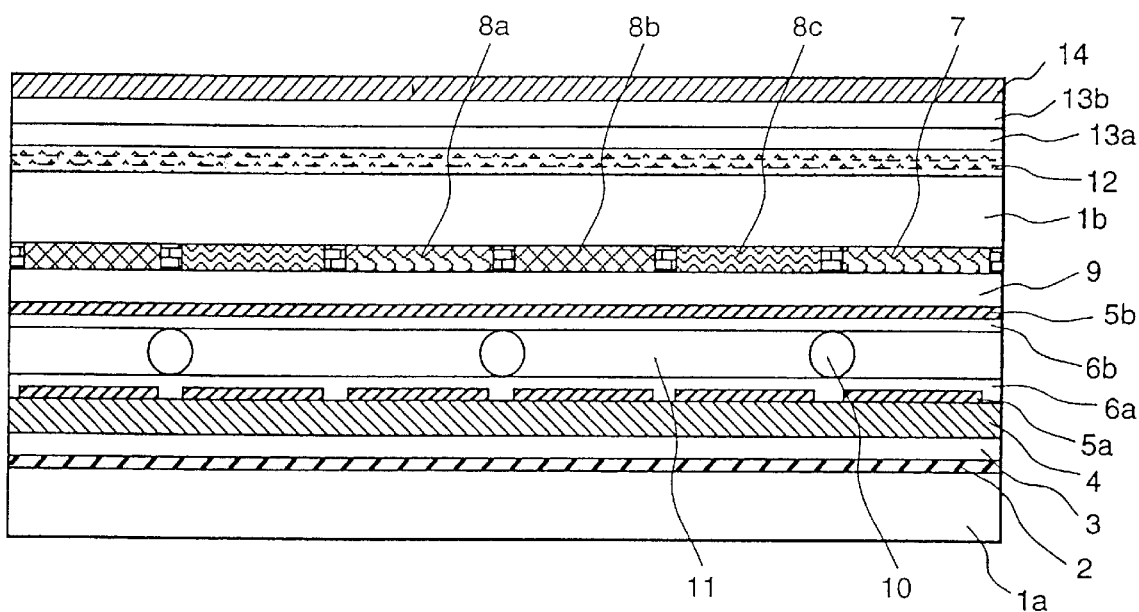
FIG. 1 is a section view of a display portion of a first embodiment of a reflection type liquid crystal display apparatus according to the present invention.

FIG. 1 is an illustration showing a section of a display portion of the first embodiment of a reflection type liquid crystal display apparatus according to the present invention.

Substrates 1a and 1b are insulating substrates. As the material of the substrates, a soda lime type glass, a low alkali boro-silicate glass, a no-alkali boro-silicate glass, no-alkali aluminosilicate glass, a silica glass or a high polymer film substrate (polyester, polyarylate, polyethersulfone, polycarbonate) and so forth may be preferred. When a soda lime type glass is employed, in order to elute the alkali from the glass, it is preferred to form a silica type thin film, such as $SiO_2$, at least on a surface contacting the liquid crystal layer 11.

In case a high polymer film substrate is employed, it becomes possible to realize a reflection type liquid crystal display apparatus having thin, light and high-impact properties. As the substrate 1a, on which a reflection layer 2 is provided, any of a low transmittance substrate, a colored substrate, an opaque substrate and so forth may be employed as long as it has an insulating property.

The reflection layer 2 may be formed of any metallic or non-metallic material irrespective of the electrical conductivity thereof as long as it has a high reflectivity at least in the visible wavelength range. For example, the reflection layer 2 can be formed with a metal thin film, such as aluminum, silver or the like, a thin film of an alloy containing aluminum or silver as a primary component, or a dielectric thin film. At this time, the reflection layer 2 is formed so as not to vary the polarizing condition before and after reflection of light on the reflection surface.

A reflection enhancing layer 3 is formed by alternately laminating a low refraction index dielectric thin film and a high refraction index dielectric thin film, each having approximately one fourth wavelength of optical thickness and being transparent at least in the visible wavelength range. The order of lamination calls for forming the low refraction index layer on the surface of the reflection layer 2, and, then, placing a high refraction index layer thereover. As required, by taking a laminate film formed of a low refraction index layer and a high refraction index layer as one set, the number of laminate films to be laminated can be increased. In accordance with the present invention, the total number of laminate films in the reflection enhancing layer 3 is more than or equal to two and less than or equal to ten. As the low refraction index layer, a dielectric thin film of $SiO_2$, $MgF_2$, $CaF_2$ or the like or a mixed dielectric thin film containing $SiO_2$, $MgF_2$, $CaF_2$ or the like as primary component can be employed. On the other hand, as high refraction index layer, a dielectric thin film of $TiO_2$, $ZrO_2$, $CeO_2$, ZnS or the like or a mixed dielectric thin film containing $TiO_2$, $ZrO_2$, $CeO_2$, ZnS or the like can be employed. Some of the low refraction index layers and the high refraction index layers may have a compression stress, while others may have a tensile stress. Therefore, when the laminate layer is formed, it is preferred to combine the layers to cancel the stress.

Orientation films 6a and 6b are formed by providing orientation processing of a polyimide orientation film at a thickness of 50 to 150 nm using a rubbing process to obtain a predetermined orientation. Also, an orientation control method other than a rubbing process may be applicable for the orientation films 6a and 6b. For instance, in case of a high polymer orientation layer which can be processed by light, the orientation process may be performed by irradiating a linear polarized light on the high polymer orientation film for polarizing the layer to a predetermined orientation.

A black matrix (hereinafter referred to as BM) 7 may be formed of acrylic type resin or epoxy type resin in a layer having a thickness of 0.5 to 2.5 μm and containing a black pigment. Also, BM 7 may be formed by a low refractory index metallic layer (a laminate film of chromium and chrome oxide or so forth) having a thickness of 0.05 to 0.3 μm.

Color filter layers 8 (8a, 8b and 8c) may be formed of an acryl type resin, a polyvinyl alcohol type resin or an epoxy type resin having a thickness of 0.5 to 2.0 μm, by individually dispersing red, green and blue filters. Also, color filter layers 8a, 8b and 8c may contain pigments of cyan, yellow and magenta.

On the other hand, the color filter layers 8a, 8b and 8c may be formed of high polymer film (gelatin, fish glue, casein, polyacryl amide, polyvinyl alcohol or the like) dyed (red, blue, green or cyan, yellow and magenta) using dyes having predetermined spectral characteristics.

An insulation layer 4 is formed of a transparent acryl type resin or epoxy type resin to a thickness of 1 to 3 μm. The insulation layer 4 is desirably formed of a material having a low dielectric constant and high light transmittance.

A spacer 10 is preferably formed by polymer beads, silica beads, a glass fiber or the like.

On the other hand, in place of the spacer 10, the gap between the substrates may be maintained by providing column shaped spacers having a predetermined height on a non-display portion on the side of the liquid crystal layer of at least one of the substrates 1a and 1b.

A liquid crystal layer 11 is formed of nematic liquid crystal material. A chiral agent may be added to achieve a predetermined twist angle. A liquid crystal molecule has a spiral structure twisted from the substrate 1b on the side of a birefringent film to the substrate 1a on the side of the reflection layer.

As birefringent films 13a and 13b, a high polymer film may be employed. Preferably, an optically uniaxial and optically biaxial phase difference film of polycarbonate, polyvinyl alcohol, polymethyl metacrylate, polyarylate, polysulfone or the like may be used.

A polarizing film 14 may be an iodine type polarizing film or a dye type polarizing film. On the other hand, a surf ace of the polarizing film 14 may be coated with a clear hard coat, for anti-glare (glare shield treatment) or anti-reflection (anti-reflection treatment).

Figure 2:
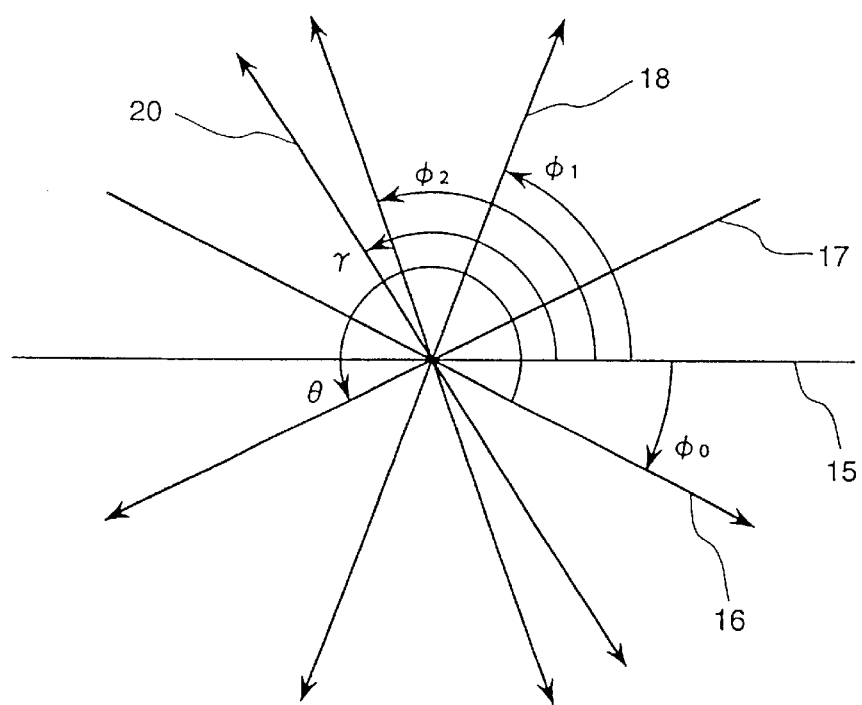
FIG. 2 is a diagram showing angles representative of the arrangement of respective components in the first embodiment of the reflection type liquid crystal display apparatus according to the present invention.

FIG. 2 is an illustration showing angles representative of the arrangement of respective components in the first embodiment of the reflection type liquid crystal display apparatus according to the present invention. In FIG. 2, the angle of an absorption axis 20 of the polarizing film 14 is indicated as y, and the angles of a lag axis 18 of the first birefringent film 13a and a lag axis 19 of the second birefringent film 13b are identified, respectively, as $\phi_1$ and $\phi_2$.

An angle, formed by an orientation 16 of the liquid crystal molecule of the liquid crystal layer 11 on the side of the substrate formed with the birefringent film and the orientation 17 on the side of the substrate formed with the reflection layer, is defined by a twist angle θ. For the illustrated embodiment of the present invention, a discussion will be given in terms of the case where the liquid crystal molecule is orientated with twisting in the counterclockwise direction from the substrate 1b on the side of the birefringent film to the substrate 1a on the side of the reflection layer. Angles of respective components are defined in a counterclockwise direction with reference to an X axis 15. Furthermore, an orientation of the liquid crystal molecule on the substrate on the side of the birefringent film is defined as $\phi_0 = 90° - \theta/2$ On the other hand, a retardation as a product of the anisotropy Δn. (value for a light having a wavelength of 633 nm) of the refraction index of the liquid crystal and the thickness $d_0$ of the liquid crystal layer is defined as $\Delta n_0 d_0$, and the values of retardation as a product of the anisotropies $\Delta n_1$ and $\Delta n_2$ (value for light having a wavelength of 550 nm) of the refraction index of the first and second birefringent films and the thickness $d_1$ and $d_2$ of the films are defined as $\Delta n_1 d_1$ and $\Delta n_2 d_2$, respectively.

In accordance with the present invention, the conditions of the respective components are:

θ is more than or equal to 220° and less than or equal to 270°;

$\Delta n_0 d_0$ is more than or equal to 0.74 μm and less than or equal to 0.82 μm;

$\phi_1$ is more than or equal to 70° and less than or equal to 90°;

$\phi_2$ is more than or equal to 100° and less than or equal to 140°;

γ is more than or equal to 120° and less than or equal to 170°;

$\Delta n_1 d_1$ is more than or equal to 160 nm and less than or equal to 220 nm; and $\Delta n_2 d_2$ is more than or equal to 370 nm and less than or equal to 470 nm.

It should be noted that the angle of the transmission axis of the polarizing film 14 may be set at γ (more than or equal to 120° and less than or equal to 170°).

EMBODIMENT

The reflection type liquid crystal display apparatus according to the present invention will be described hereinafter in terms of particular embodiments.

The present invention will be discussed in terms of a 1/2 VGA adapted handheld type personal computer (hereinafter referred to as handheld PC) having a diagonal screen size of 8.1 inches, a dot number of 640(W)×RGB×240(H) dots, a dot pitch of 0.1(W) mm×0.3(H) mm, a dot size of 0.088(W) mm×0.288(H) mm, and a pixel matrix of RGB vertical stripe, or a reflection type super twisted nematic (STN) liquid crystal display apparatus capable of color display to be used in a monitor or the like (hereinafter referred to as a reflection type color STN liquid crystal display apparatus).

The electrode construction of the reflection type color STN liquid crystal display apparatus has a simple matrix electrode structure having 240 electrodes as signal side electrodes with a 300 μm electrode pitch, a 288 μm of electrode width and a 12 μm electrode interval, and 1920 electrodes as scanning side electrodes (640×RGB) with a 100 μm of electrode pitch, a 88 μm of electrode width and a 12 μm electrode interval.

It should be noted that the following embodiments are examples of the present invention and should not be taken to limit the scope of the present invention.

First Embodiment

The first embodiment of a reflection type liquid crystal display apparatus according to the present invention will be discussed with reference to FIGS. 1 to 5.

FIG. 1 is a section of a display portion of the first embodiment of a reflection type liquid crystal display apparatus according to the present invention.

As the substrates 1a and 1b, soda lime type glass which is 0.7 mm thick is employed. In order to prevent alkali from eluting from the glass, an $SiO_2$ film is formed over the surface on which transparent electrodes 5a and 5b are formed. On the $SiO_2$ film on the substrate 1a, the reflection layer 2, having a mirror surface of aluminum and which is 100 nm thick, is formed over the entire surface within a region corresponding to a display portion. On the surface of the reflection layer 2, a low refraction index dielectric thin film ($SiO_2$) and high refraction index dielectric thin film ($TiO_2$), each having an optical thickness of approximately ¼ wavelength, are alternately laminated to form a four layer reflection enhancing film 3.

Since the reflection layer 2 formed with the reflection enhancing film 3 can attain a higher reflectance than that attained when the reflection layer 2 is solely employed, a brighter display can be realized. On the other hand, in the illustrated embodiment, since the reflection layer 2 is not patterned, the reflection layer 2 may not come into contact with a chemical agent or chemical gas which would otherwise be used for the patterning process. Therefore, a high reflectance immediately after the formation thereof can be maintained. Furthermore, since the reflection enhancing film 3 may serve as a surface protection film of the reflection layer 2, a lowering of the reflectance or the formation of a scratch due to oxidation or corrosion can be successfully prevented. It should be noted that the reflection layer can be patterned as required. For example, the reflection layer may be formed into the same shape as the transparent electrodes 5a or 5b, or it may be formed only in respective pixel portions. In such a case, fluctuation of the liquid crystal driving voltage due to the influence of capacity coupling between the transparent electrodes 5a can be reduced significantly.

Over the reflection enhancing layer 3, an insulation layer 4 is formed of a transparent resin 2 μm thick. At this time, the refraction index of the insulation layer 4 is preferably formed of a transparent resin having a higher transmittance and lower refraction index than the refraction index of the uppermost layer (forming surface of the insulation layer 4). By forming the insulation layer 4 with a transparent resin having a low dielectric constant, the capacitance of a capacitor, formed with the reflection layer 2, the transparent electrode 5a and the reflection enhancing film 3, the insulation layer 4 between the transparent electrode 5a and the reflection enhancing film 3, can be made small to successfully prevent degradation of a display quality by lowering fluctuation of the liquid crystal drive voltage due to capacitive coupling.

On the insulation layer 4, the transparent electrode 5a of 260 nm thickness formed with an ITO film is provided as the signal side electrode. The orientation film 6a formed thereon extends over the entire surface within the region corresponding to the display portion.

The reflection enhancing film 3 and the insulation layer 4 provided over the reflection layer 2 serve as a protecting film for the reflection surface to maintain a high refraction index by preventing scratching, oxidation or corrosion of the reflection surface. On the other hand, the electrode terminal of the substrate on the side of the reflection layer is formed with an ITO film, and, thus, it has a high mechanical strength so as to be hardly oxidized or corroded. Therefore, an increase or fluctuation of the connection resistance of the TCP can be suppressed to facilitate connection or correction.

While the illustrated embodiment is provided with the reflection enhancing film 3 and the insulation layer 4 on the reflection layer 2, either one can be omitted as required.

On the other hand, on the $SiO_2$ film on the substrate 1b, a BM 7 is formed with a resin mixed with a black pigment between the pixels and peripheral portion of the display region on the BM 7, color filters 8 (red: 8a, green: 8b and blue: 8c) are formed corresponding to predetermined pixels, respectively. On the color filters 8, a flattening layer 9 of 2 μm thickness is formed with the transparent resin to flatten any irregularity on the surface of the color filter 8 over the flattening layer 9, the transparent electrode 5b of 260 nm thickness is formed with the ITO film as the scanning side electrode. Then, the orientation film 6b is formed on the transparent electrode 5b over the entire surface of the display portion.

It should be noted that the BM 7 and the flattening layer 9 may be arbitrarily employed and thus can be omitted. When the BM 7 is omitted, it is preferred to abut or overlap the adjacent color filters at a position between the electrodes of the transparent electrode 5a in order to prevent lowering of the contrast of the display.

Figure 13:
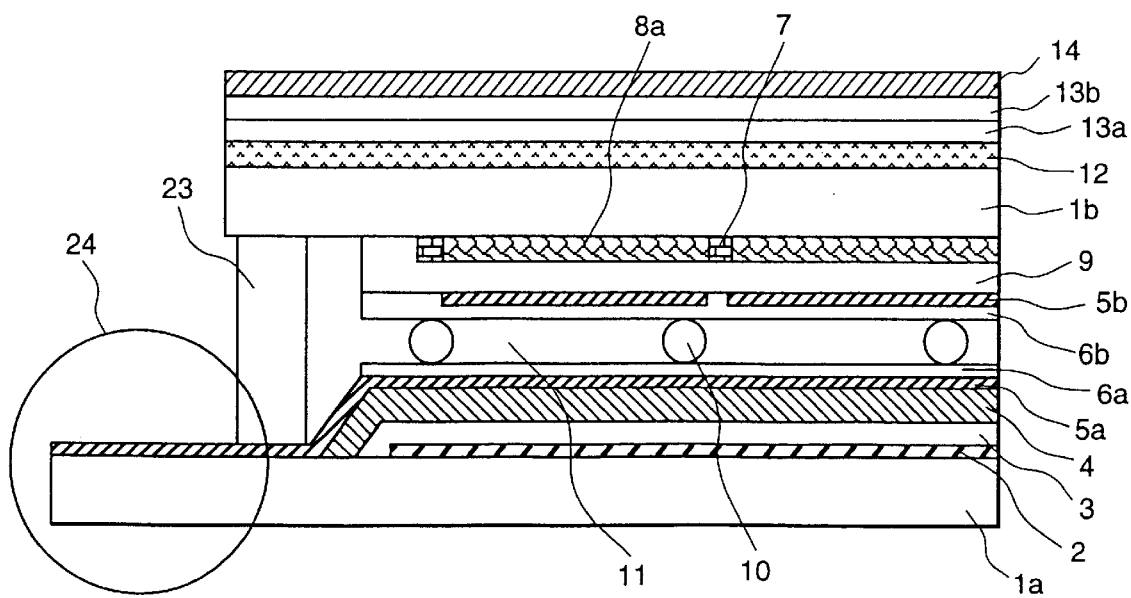
FIG. 13 is a section view of an electrode terminal portion of the reflection type liquid crystal display apparatus according to the present invention.

The substrates 1a and 1b are arranged so that the orientation films 6a and 6b formed on respective substrates are placed in opposition to each other, and the transparent electrodes 5a and 5b perpendicularly intersect to form a matrix electrode arrangement. Furthermore, between the substrates 1a and 1b, the liquid crystal layer 11 of nematic liquid crystal, with an added chiral agent for establishing a twist angle e of 250°, and the spacer 10 of polymer beads, for maintaining the gap between the substrates constant, are disposed, FIG. 13 is a section of the electrode terminal portion. The substrates 1a and 1b are bonded and sealed with a sealing agent 23 admixed with the spacers 10 in the peripheral portion of both substrates. The inlet for supply of the liquid crystal is sealed by a sealing agent, such as an ultraviolet curing resin, epoxy type resin, acryl resin, silicone resin or the like. As the spacers admixed in the sealing agent 23, a spacer having a different diameter from that of the spacer provided in the pixel portion may be Used as required.

Furthermore, the electrode terminal portion 24 of the transparent electrode 5a formed on the substrate 1a is arranged and formed so as to be exposed at the end portion of the substrate for connection with the TCP or the like mounted on the liquid crystal driving IC. In the illustrated embodiment, the electrode terminal portion 24 has a construction, in which only the transparent electrode 5a is provided on the substrate 1a. Since the transparent electrode 5a has high resistance against oxidation and corrosion, connection failure due to an increase in or fluctuation of the connection resistance upon TCP connection can be reduced. On the other hand since the transparent electrode 5a has high contact adhesion with the substrate 1a, the connection strength of the TCP becomes high. Also, even when peeling off the TCP, peeling of the film will not be caused, thereby to permit correction by re-connection of the TCP to significantly improve the production yield. Furthermore, when the transparent electrode 5a of the electrode terminal portion 24 and the TCP are connected by applying heat and pressure with formation of the anisotropic conductive film, connection can be achieved without causing adverse influence of heat for the layer lower than the transparent electrode 5a.

Also, on the outer surface of the substrate 1b shown in FIG. 1, a light scattering layer 12, the first birefringent film 13a, the second birefringent film 13b and the polarizing film 14 are laminated in sequential order. By providing the light scattering layer 12, imprinting can be avoided even when the reflection layer 2 has a mirror surface to permit display with natural view angle.

Retardation ($\Delta n \cdot d$) and the angle of the lag axes of the first and second birefringent films 13a and 13b, and the angle of the absorption axis of the polarizing film 14 are set for a normal black display, in which the display becomes a black display at low voltage and a white display at high voltage, upon driving the liquid crystal layer 11 by applying a voltage between the transparent electrodes 5a and 5b.

In the illustrated embodiment, respective components have the following specification in the angle chart of FIG. 2. $\theta$ is 250°, $\Delta n_0 d_0$ is 0.76 $\mu$m, $\phi_1$ is 73°, $\phi_2$ is 108°, $\gamma$ is 122°, $\Delta n_1 d_1$ is 165 nm and $\Delta n_2 d_2$ is 450 nm.

On the other hand, as the polarizing film 14, G1220DU available from Nitto Denko K.K. is employed, and as the first and second birefringent films 13a and 13b, an oriented film of polycarbonate is used. As the light scattering layer 12, an internal diffusion sheet (IDS) available from Dai-Nippon Insatsu K.K. and a light control film (Lumisty) available from Sumitomo Kagaku Kogyo K.K may be used. In the alternative, a diffuse adhesive layer, prepared by admixing beads, particulate matter and the like in an adhesive material, may also be used.

In FIG. 1, the light scattering layer 12 is provided between the substrate 1b and the first birefringent film 13a. When IDS is used, the IDS is disposed between the second birefringent film 13b and the polarizing film 14, and the IDS is arranged so that the lag axis of the base film of the IDS is oriented in parallel to or perpendicular to the absorption axis of the polarizing film 14 to avoid any influence due to the birefringence of the IDS.

On the other hand, in case of the light scattering layer 12 having no birefringency, the light scattering layer 12 may be provided between the first birefringent film 13a and the second birefringent film 13b. Then, since the light scattering layer 12 is sandwiched by films of the same material, variation of the scattering characteristics due to peeling or deformation of the light scattering layer 12 can be reduced even when deformation is caused in the optical film due to variation of the temperature and humidity.

A similar display may also be obtained by setting the transmission axis of the polarizing film 14 at $\gamma$ (122°).

Figure 14:
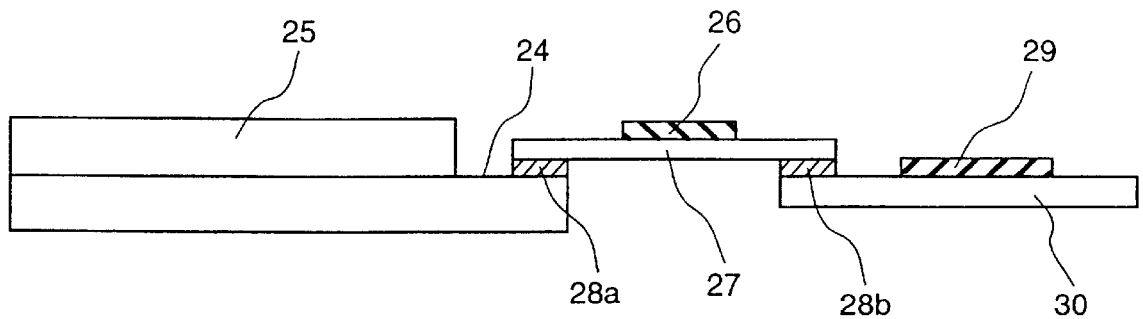
FIG. 14 is a section view showing an electrode terminal and a connecting portion of a liquid crystal driving IC of the reflection type liquid crystal display apparatus according to the present invention.

FIG. 14 is a section of the connecting portion between the electrode terminal and the liquid crystal driving IC of the reflection type liquid crystal display apparatus according to the present invention.

As shown in FIG. 14, to the electrode terminal portion 24 on the signal side and the scanning side of the reflection type liquid crystal display apparatus 25, an output side terminal of the TCP 27 mounted on the liquid crystal driving IC 26 generating the driving voltage is connected by a thermosetting type anisotropic conductive film 28a, so as also to be connected electrically. To the input side terminal of the TCP 27, a circuit board 30, provided with chip element 29, such as a circuit wiring pattern and a resistor element, a capacitor element, a connector and the like, is connected by a thermosetting anisotropic conductive film 28b or by soldering.

Figure 15:
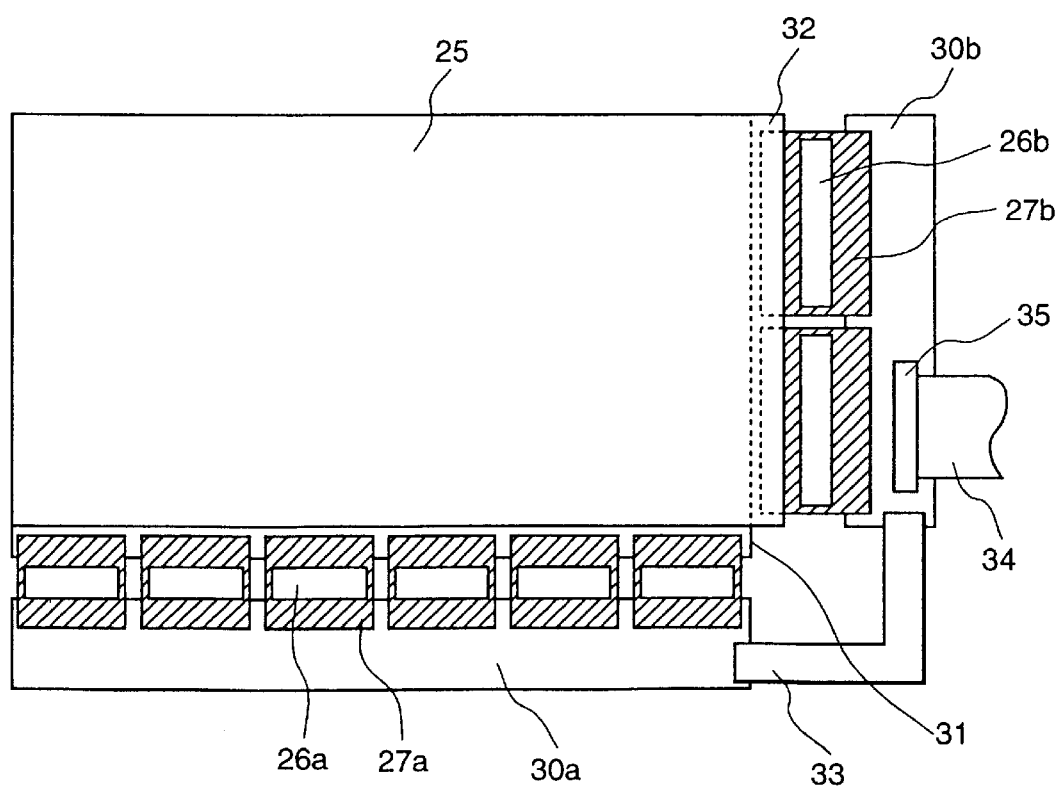
FIG. 15 is a plan view generally showing the connection between the reflection type liquid crystal display apparatus and a TCP according to the present invention.

FIG. 15 is an external view of the connecting portion between the reflection type liquid crystal display apparatus according to the present invention and the TCP.

FIG. 15 shows one example of the case where a terminal portion 31 of the reflection type liquid crystal display apparatus 25 is taken as the signal side electrode terminal, and the terminal portion 32 is taken as the scanning side electrode terminal. To the terminal portion 31 of the signal side electrode, the output side terminal of the TCP 27a mounting the signal side liquid crystal driving IC 26a is connected. To the input side terminal of the TCP 27b, a circuit board 30a mounting the chip element 29 is connected.

On the other hand, to the terminal portion 32 of the scanning side electrode of the reflection type liquid crystal display apparatus 25, the output side terminal of the TCP 27b mounting the scanning side liquid crystal driving IC 26b is connected. To the input side terminal of the TCP 27b, a circuit board 30b mounting the chip element 29 and the connector 35 is connected.

The circuit boards 30a and 30b are electrically connected by a wiring 33. On the other hand, to the connector 35, a wiring 34, such as a FPC (flexible printed circuit), a FFC (flexible flat cable) and so forth, is connected to externally supply a video signal from an external circuit.

FIG. 15 shows an example where the TCPs 27a and 27b and the circuit boards 30a and 30b are arranged horizontally with respect to the display surface of the reflection type liquid crystal display apparatus 25. However, since the TCPs 27a and 27b are foldable, the signal side liquid crystal driving IC 26a, the circuit board 30a, the scanning side liquid crystal driving IC 26b and the circuit board 30b may be arranged on the back side surface of the reflection type liquid crystal display apparatus 25.

Furthermore, by assembling the reflection type liquid crystal display apparatus 25, to which the TCPs 27a and 27b and the circuit boards 30a and 30b are connected, in a frame or a casing, the liquid crystal display apparatus of the present invention is completed.

Next, the display characteristics of the illustrated embodiment of the reflection type liquid crystal display apparatus will be described.

Figure 3:
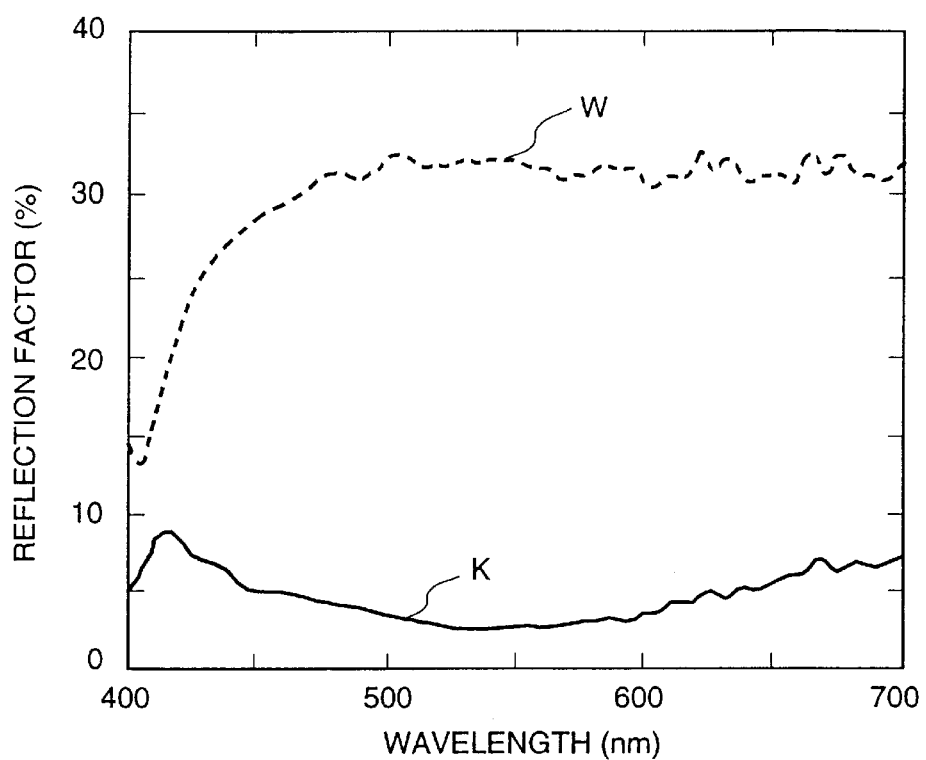
FIG. 3 is a graph showing reflectivity-wavelength characteristics of the first embodiment of the reflection type liquid crystal display apparatus according to the present invention.
Figure 4:
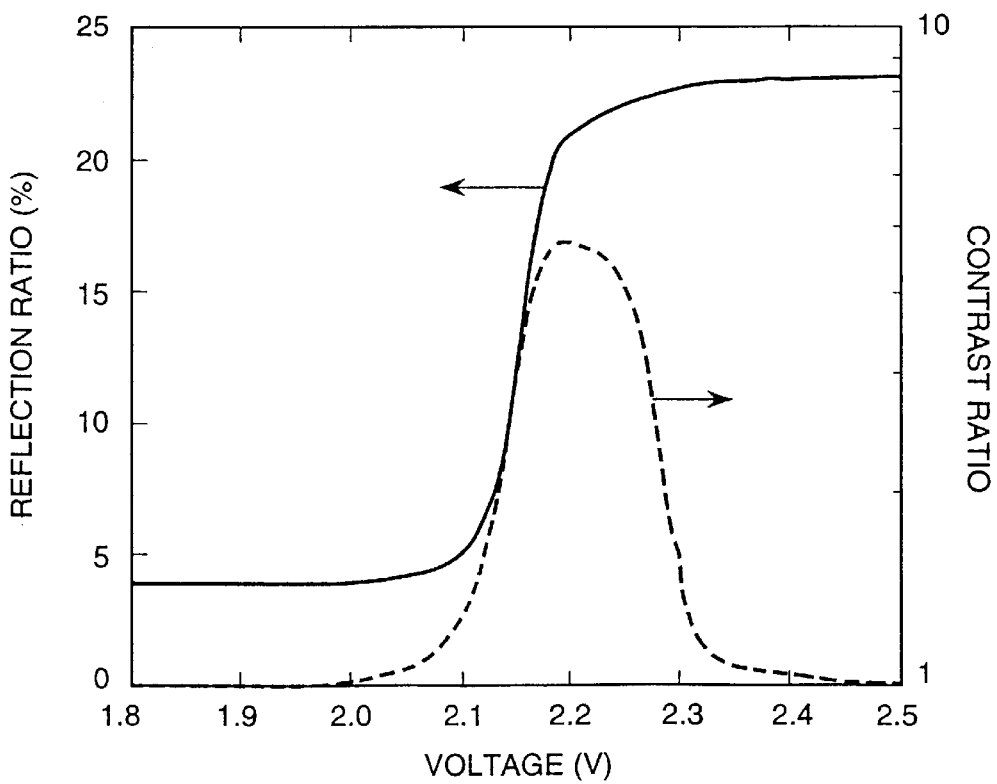
FIG. 4 is a graph showing a reflectivity and contrast ratio-apply voltage characteristics of the first embodiment of the reflection type liquid crystal display apparatus according to the present invention.
Figure 5:
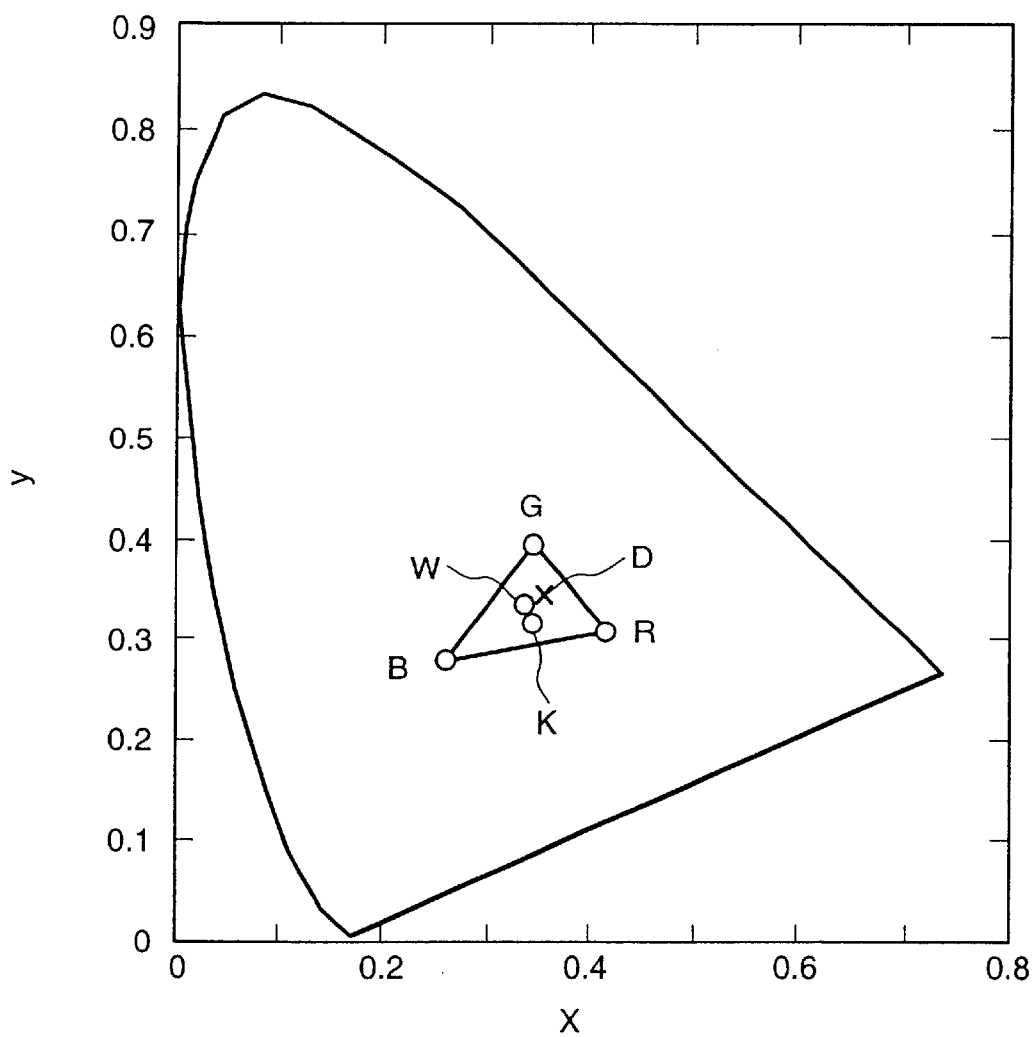
FIG. 5 is a graph showing the chromaticity of a color display of the first embodiment of the reflection type liquid crystal display apparatus according to the present invention.

A reflectivity-wavelength characteristic of the reflection type liquid crystal display apparatus produced as set forth above is shown in FIG. 3, reflectivity and contrast ratio-apply voltage characteristics thereof are shown in FIG. 4, and the chromaticity of a color display is shown in FIG. 5. All of the foregoing characteristics show values measured from the front side of the display surface while employing the IDS in the light scattering layer of the reflection type liquid crystal display apparatus and driving the device at a 1/240 duty. On the other hand, the values are the result of measurement performed under a normal office environment, namely under conditions of actual use.

As seen from FIG. 3, a spectrum K of the black display shows that a low reflectance over the entire visible wavelength range (400 nm to 700 nm) and a substantially uniform reflectance is obtained. Thus, an achromatic black display of low wavelength dependency is achieved.

On the other hand, a spectrum W of the white display, in which reflectance is uniform over substantially the entire visible wavelength range (400 nm to 700 nm), is obtained. It should be noted that while the reflectance is lowered in the range lower than or equal to 450 nm, since this range is a region where visual perceptivity is low, the influence on the display also will be small. Thus, a good achromatic white display can be produced.

FIG. 4 shows a reflectivity characteristics curve of the reflectance of the white display. A maximum contrast ratio 5:1 can be obtained. At this time, the reflectance is 20%. The reflectance is measured while taking the reflectance measured in the same environment with reference to the reflectance of a standard white diffusion plate. As set forth, under conditions of actual use, a contrast ratio of about 5:1 is obtained. Thus, sufficient characteristics for practical use as a reflection type liquid crystal display apparatus can be obtained.

In FIG. 5, a sign x (D) denotes a values of chromaticity resulting from measurement of the standard white diffusion plate arranged similarly to the reflection type liquid crystal display apparatus and represents a color of illumination. In the illustrated embodiment of the reflection type liquid crystal display apparatus, the chromaticity of the white display (W) and the black display (K) is quite close to the chromaticity of the standard white diffusion plate, resulting in a good achromatic monochrome display. Measured values of chromaticity of red (R), green (G) and blue (B) are distributed around the white display (W) and the black display (K). Thus, a color display with a good color tone can be realized.

Measuring the reflectivity and contrast ratio of newspaper indicates that the reflectivity is 50% and the contrast ratio is about 5:1. The illustrated embodiment of the reflection type liquid crystal display apparatus realizes a contrast ratio comparable with that of a newspaper, while the reflectivity is low. Accordingly, under a bright environment, such as outdoors, a display quality comparable with a newspaper can be realized.

In the illustrated embodiment, the reflection surface is protected by providing the reflection enhancing film 3 and the insulation layer 4 on the reflection layer 2. Therefore, a lowering of the reflectivity due to formation of a scratch, oxidation or corrosion can be successfully prevented.

On the other hand, since the electrode of the reflection layer side substrate is formed with an ITO film, it has a higher mechanical strength and a higher resistance against oxidation and corrosion than the aluminum electrode. Therefore, an increase in or fluctuation of the connection resistance of the TCP can be reduced. Furthermore, connection or correction can be facilitated.

Also, since the reflection layer has a mirror surface, the surface of the orientation film provided on the uppermost layer on the reflection layer can be formed flat. The liquid crystal within the pixel is uniform in thickness and has no disturbance in orientation, making it possible to attain a display of high contrast with a constant threshold voltage of the liquid crystal.

On the other hand, since the reflection layer is provided with a mirror surface and the surface of the orientation film provided in the uppermost layer on the reflection layer is formed so as to be flat, the gap between the substrates can be maintained at a high precision even with a granular spacer, such as beads or so forth. A high contrast display with no display fluctuation can be achieved.

On the other hand, even with the diffuse reflection electrode having an irregularity on the surface of the reflection layer, the irregularity of the reflection layer can be reduced or accommodated by providing the insulation film serving as a flattening layer. Therefore, the surfaces of the transparent electrode and the orientation layer formed on the insulation film become flat so as to make the thickness of the liquid crystal layer in the pixel uniform, thereby to eliminate variation of the threshold voltage of the liquid crystal and disturbance of the orientation of liquid crystal molecule, making it possible to produce a high contrast display.

By defining the conditions of the liquid crystal 11, the first and second birefringent films 13a and 13b and the polarizing film 14 and employing a color filter, an achromatic monochrome display can be realized, and, in conjunction therewith, a color display with high color purity and good color tone can be attained.

It should be noted that the conditions of the liquid crystal layer 11, the first and second birefringent films 13a and 13b and the polarizing film 14 are suitably applicable for any reflection type liquid crystal display apparatus having the STN liquid crystal to enable a white display and a black display in an achromatic color.

On the other hand, in the illustrated embodiment, the transparent electrode 5a is formed as the signal side electrode and the transparent electrode 5b is formed as the scanning side electrode. It is also possible to form the transparent electrode 5a as the scanning side electrode and the transparent electrode 5b as the signal side electrode.

Furthermore, although the light scattering layer 12 may be formed as single layer, the light scattering layer 12 can also be formed as a laminated layer, as required. In such a case, the resolution of the display image is lowered with an increase in the number of laminated layers. Therefore, it is preferred that the number of layers to be laminated should be four at the most with plural laminated layers being illustrated in dashed lines in FIG. 1, for explanatory purposes. On the other hand, it is also possible to laminate light scattering layers having different scattering characteristics in combination. Thus, even when the light scattering layer is formed as part of the internal structure of the liquid crystal element, a reflection type liquid crystal display apparatus having various view angle characteristics can be manufactured easily Even in the case where a plurality of light scattering layers are provided, it is possible to dispose the light scattering layer in an arbitrary portion between the layers, in which the substrate 1b, the first birefringent film 13a, the second birefringent film 13b and the polarizing film 14 are laminated, in a lump. In the alternative, the individual layers forming the light scattering layer may be distributed in two or three portions between the layers of the laminate of the substrate 1b, the first birefringent film 13a, the second birefringent film 13b and the polarizing film 14.

It should be noted that while the illustrated embodiment has been discussed in terms of one example of a normally black display, it is also possible to form a reflection type liquid crystal display apparatus having a normally white display by modifying the combination of the retardation ($\Delta$n·d) and the angle of the lag axes of the first and second birefringent films 13a and 13b, and the angle of the absorption axis of the polarizing film 14, to attain a white display at a low voltage and a black display at a high voltage, when the liquid crystal layer 11 is driven by applying a voltage between the transparent electrodes 5a and 5b.

Second Embodiment

Figure 6:
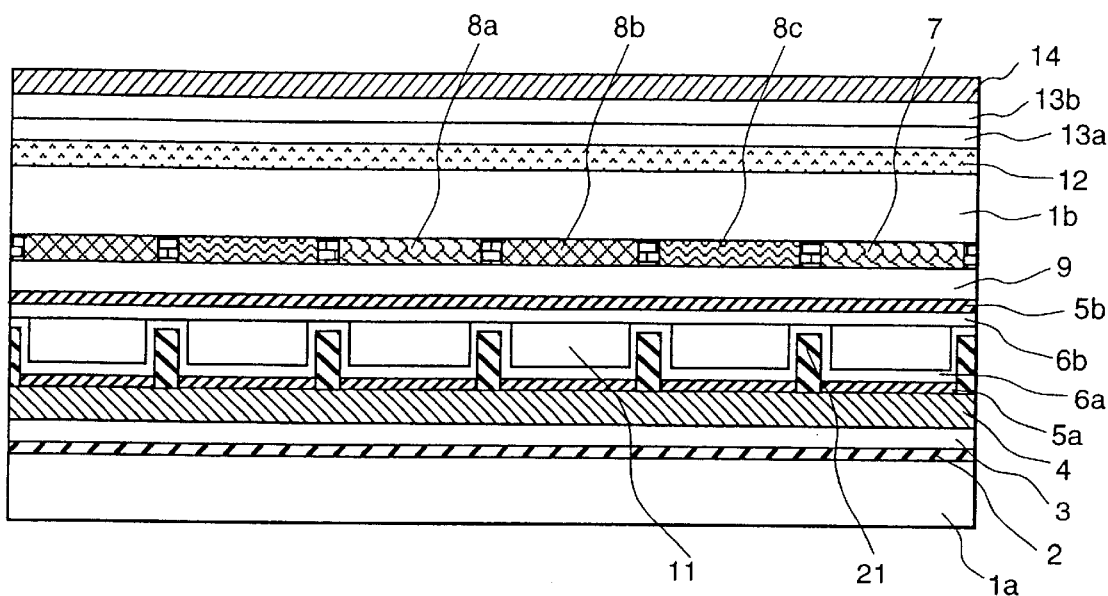
FIG. 6 is a section view of a display portion of a second embodiment of a reflection type liquid crystal display apparatus according to the present invention.

FIG. 6 is a section of the display portion representing a second embodiment of the reflection type liquid crystal display apparatus according to the present invention.

The illustrated embodiment employs column shaped spacers 21 for maintaining the gap between the substrates in place of the spacer 10 in the first embodiment of the reflection type liquid crystal display apparatus. Therefore, the illustrated embodiment has the same construction as the first embodiment set forth above, except for the construction discussed hereinafter.

The reflection layer 2, the reflection enhancing film 3, the insulation layer 4, and the transparent electrode 5a are formed in the same manner as that of the first embodiment. Between electrodes of the transparent electrode 5a or the transparent electrode 5b, column shaped spacers 21 of a predetermined height are formed using an ultraviolet curing resin or an acryl type resin. The orientation film 6a is formed thereon.

Figure 7:
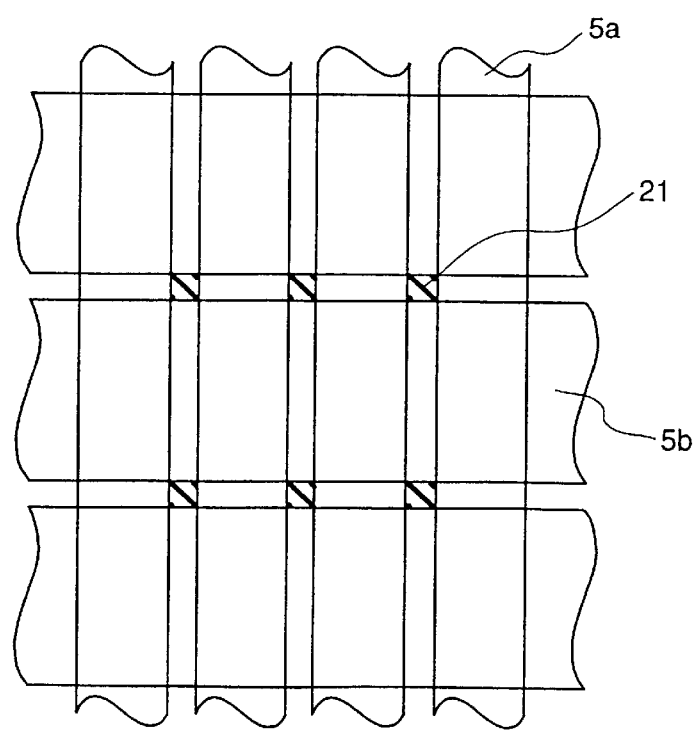
FIG. 7 is a front elevation of a pixel portion showing the arrangement of a column shaped spacer.

FIG. 7 is a front elevation of the pixel portion showing the arrangement of the column shaped spacers.

In the illustrated embodiment, the column shaped spacers 21 are provided at four corners of one pixel. The number of column shaped spacers 21 can be increased or decreased as required. On the other hand, the column shaped spacers 21 may be provided at arbitrary positions as long as they are disposed in the non-display portion. The sectional shape of the column shaped spacer 21 as viewed from the display surface is square in the illustrated embodiment. However, the sectional shape of the column shaped spacer 21 may be rectangular, polygonal, circular or elliptic. On the other hand, it is also possible to vary the arrangement density of the column shaped spacers or the shape of the section or area of the column shaped spacer as viewed from the display surface, depending on the site of the arrangement.

In the illustrated embodiment, a similar effect to the first embodiment can be obtained. In addition, since the column shaped spacer 21 is provided in the non-display portion and is arranged below the BM 7 as viewed from the display surface, a good light shielding becomes possible even when the orientation of the liquid crystal molecules is disturbed in the portion around the column shaped spacer so as to cause leakage of the light. Therefore, a high display contrast can be maintained.

Furthermore, since the position, the density and the cross-sectional shape of the column shaped spacer can be controlled, the gap between the substrates can be maintained at a high precision to achieve a uniform display quality without any display fluctuation.

Third Embodiment

Figure 8:
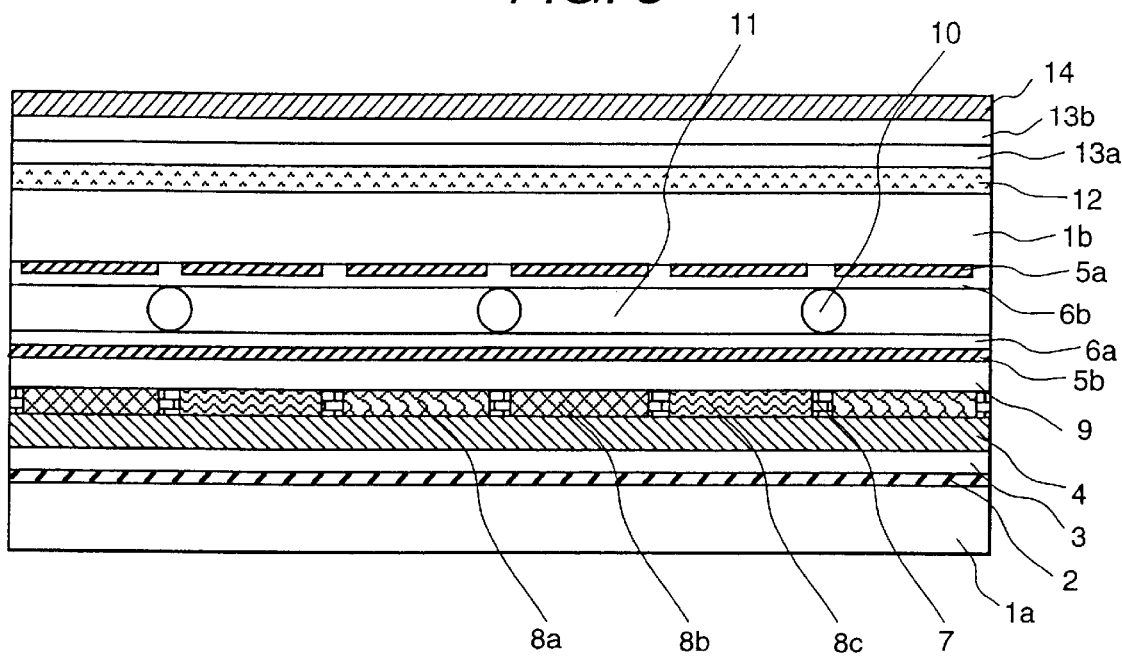
FIG. 8 is a section view of a display portion of a third embodiment of a reflection type liquid crystal display apparatus according to the present invention.

FIG. 8 is a section of the display portion showing a third embodiment of the reflection type liquid crystal display apparatus according to the present invention.

The illustrated embodiment is constructed by providing the BM 7, the color filters 8 (8a, 8b and 8c) and the flattening layer 9 on the substrate on the side of the reflection layer, in the first embodiment of the reflection type liquid crystal display apparatus. The illustrated embodiment has the same construction as the first embodiment set forth above, except for the construction on the substrates 1a and 1b, which will be discussed hereinafter.

On the substrate 1a, the reflection layer 2, the reflection enhancing film 3 and the insulation layer 4 are formed. Between the pixels and the peripheral portion of the display region on the insulation layer 4, the BM 7 is formed with a resin admixed with black pigment. Furthermore, on the BM 7, the color filters 8 (red: 8a, green: 8b and blue: 8c) are formed corresponding to a predetermined pixel. At this time, it is desirable to form the insulation layer 4 with the transparent resin having a high transparency and a low dielectric constant. On the color filter 8, the flattening layer 9 of 2 $\mu$m thickness is formed with the transparent resin to flatten any irregularity on the surface of the color filter 8. On the flattening layer 9, the transparent electrode 5b having a thickness of 260 nm and formed with the ITO film is provided as the scanning side electrode. On the transparent electrode 5b, serving as the scanning side electrode, the orientation film 6a is formed over the entire surface within the region corresponding to the display portion.

On the other hand, on the substrate 1b, the transparent electrode 5a, having a thickness of 260 nm and formed with the ITO film, is provided as the signal side electrode. On the transparent electrode 5a, the orientation film 6b is formed over the entire surface of the display portion.

With the illustrated embodiment, a similar effect to the first embodiment can be obtained, and in conjunction therewith, it becomes possible to directly form a large number of the transparent electrodes 5a, serving as the signal side electrodes, on the surface of the substrate, thereby accommodating electrodes of narrow width. Also, shorting between the transparent electrodes 5a can be easily corrected by a laser beam or the like. Furthermore, since connection and correction of the TCP can be done easily, the liquid crystal elements can be manufactured with a high yield.

On the other hand, even when the reflection layer 2 is formed with the conductive material over the entire surface of the display portion, in view of the provision of the insulation layer 4 formed to a predetermined thickness with a transparent resin of low dielectric constant, the capacity of the capacitor formed by the reflection layer 2, the transparent electrode 5b and a plurality of dielectric layers (reflection enhancing film 3, insulation layer 4, color filter 8 and flattening layer 9) disposed therebetween, can be reduced to be small value. Accordingly, fluctuation of the liquid crystal driving voltage due to capacitive coupling of respective transparent electrodes 5b can be reduced to attain a satisfactory display quality by preventing occurrence of display failure.

Furthermore, since the insulation layer 4 has high transparency, absorption loss of the light in the insulation layer 4 is small. On the other hand, since the reflection layer 2 provided with the reflection enhancing film 3 provides improved reflection efficiency, a display comparable or even higher in brightness than that provided by a conventional reflection type liquid crystal display apparatus can be attained.

It should be noted that while the component layers are formed in the order of the reflection enhancing film 3, the insulation layer 4, BM 7, the floor filter 8 and the flattening layer 9 in the illustrated embodiment, it is possible that the insulation layer 4 is formed to also serve as the flattening layer 9. In this case, the capacity of the capacitor can be further reduced to significantly lower any fluctuation of the liquid crystal driving voltage due to capacitive coupling. On the other hand, by properly modifying the layer thickness of the insulation layer 4, the flattening layer 9 can be omitted. In this case, the component layers may be formed in the order of the reflection layer 2, the reflection enhancing film 3, the insulation layer 4, the BM 7, the color filter 8 and the transparent electrode 5b, or in the order of the reflection layer 2, the reflection enhancing film 3, the BM 7, the color filter 8, the insulation layer 4 and the transparent electrode 5b, to attain the same effect as obtained in the illustrated embodiment.

On the other hand, in the illustrated embodiment, the column shaped spacers are provided to maintain the gap between the substrates in a manner similar to the second embodiment.

Fourth Embodiment

Figure 9:
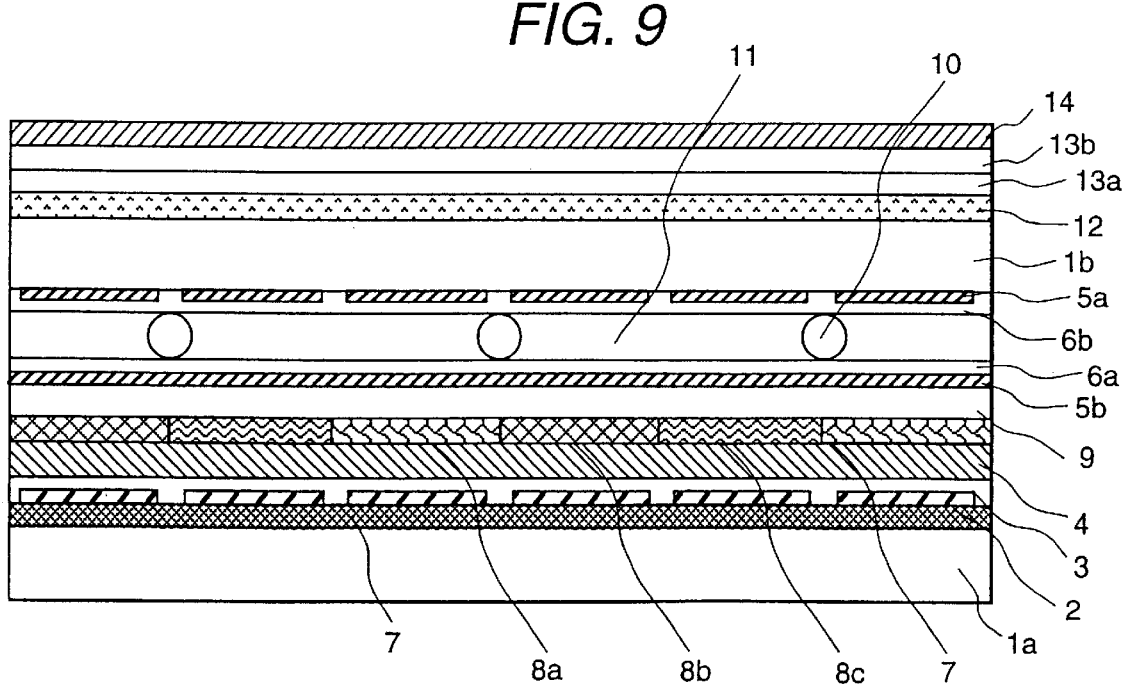
FIG. 9 is a section view of a display portion of a fourth embodiment of a reflection type liquid crystal display apparatus according to the present invention.

FIG. 9 is a section showing the display portion of a fourth embodiment of the reflection type liquid crystal display apparatus according to the present invention.

The illustrated embodiment is constructed by forming a light shielding layer between the substrate 1a and the reflection layer 2, and the BM is formed with the light shielding layer exposed by removing the reflection layer in the portions between the pixels and the peripheral portion of the display region, in the third embodiment of the reflection type liquid crystal display apparatus. The illustrated embodiment has the same construction as the first embodiment except for the construction of respective layers formed on the substrate 1a, which will be discussed hereinafter.

The resin layer admixed with black pigment is formed over the entire surface in the region corresponding to the display portion on the substrate 1a. The reflection layer 2 is formed on the resin layer corresponding to the pixel portion to form the BM 7 with the black resin layer exposed between the pixels and in the peripheral portion of the display region. The reflection enhancing film 3 and the insulation layer 4 are formed on the reflection layer 2. Furthermore, the color filter 8 (red: 8a, green: 8b and blue: 8c) is formed corresponding to respectively predetermined pixels and abuts with the adjacent color filter on the BM 7. At this time, the insulation layer 4 is desirably formed with a transparent resin having a high transparency and a low dielectric constant. On the color filter 8, a flattening layer 9 of 2 μm thickness is formed with the transparent resin to flatten the surface of the color filter 8. On the flattening layer 9, the transparent electrode 5b of 260 nm thickness formed with the ITO film is provided as the scanning side electrode. On the transparent electrode, the orientation film 6a is formed over the entire surface within the region corresponding to the display portion.

On the other hand, on the substrate 1b, the transparent electrode 5a of 260 nm thickness formed with the ITO film is provided as the signal side electrode. On the signal side electrode, the orientation film 6b is formed over the entire surface of the display portion.

According to the illustrated embodiment, an effect similar to that obtained in the third embodiment can be attained. In conjunction therewith, since the reflection layer 2 is provided only in the pixel portion, the capacitive coupling between respective transparent electrodes 5b by the capacitor formed by the reflection layer 2, the transparent electrode 5b and a plurality of dielectric layers (reflection enhancing film 3, the insulation layer 4, the color filter 8 and the flattening layer 9) disposed therebetween, can be divided. Accordingly, fluctuation of the liquid crystal driving voltage to be applied to respective transparent electrodes 5b can be reduced to prevent the occurrence of a display failure.

On the other hand, since the step of the BM 7 is determined by the layer thickness of the reflection layer 2, the step can be reduced even when the BM is formed with a black resin layer to improve the flatness of the transparent electrode 5b or the orientation film 6.

Furthermore, the precision of patterning of the BM 7 becomes the precision of patterning of the reflection layer 2 of the metal thin film which has a relatively high patterning precision, to permit the BM of black resin to be formed into a fine line.

On the other hand, in the construction of the element in the illustrated embodiment, the numerical aperture of the pixel is substantially determined by the reflection layer 2 of the metal thin film having a relatively high patterning precision and the transparent electrodes 5a and 5b. Therefore, a high numerical aperture can be achieved to enable a high contrast display.

In the illustrated embodiment, while the flattening layer 9 is provided on the color film, since the step of the BM 7 is small, the flattening layer 9 can be omitted as required.

On the other hand, by forming the substrates as a low reflection substrate, colored substrate or opaque substrate, the black resin layer can also be omitted.

Furthermore, in the construction of the illustrated embodiment, no reflection layer is formed between the pixels and the peripheral portion of the display region, and since unnecessary light can be reduced even by the color filter, a practically satisfactory display can be attained even when the black resin layer is omitted.

It should be noted that while the component layers are formed in the order of the reflection enhancing film 3, the insulation layer 4, BM 7, the floor filter 8 and the flattening layer 9 in the illustrated embodiment, it is possible for the insulation layer 4 to also serve as the flattening layer 9. In this case, the capacity of the capacitor can be further reduced to significantly lower any fluctuation of the liquid crystal driving voltage due to capacitive coupling. On the other hand, by properly modifying the layer thickness of the insulation layer 4, the flattening layer 9 can be omitted. In this case, the component layers may be formed in the order of the reflection layer 2, the reflection enhancing film 3, the insulation layer 4, the BM 7, the color filter 8 and the transparent electrode 5b, or in order of the reflection layer 2, the reflection enhancing film 3, the BM 7, the color filter 8, the insulation layer 4 and the transparent electrode 5b, to attain the same effect as obtained in the illustrated embodiment.

Fifth Embodiment

Figure 10:
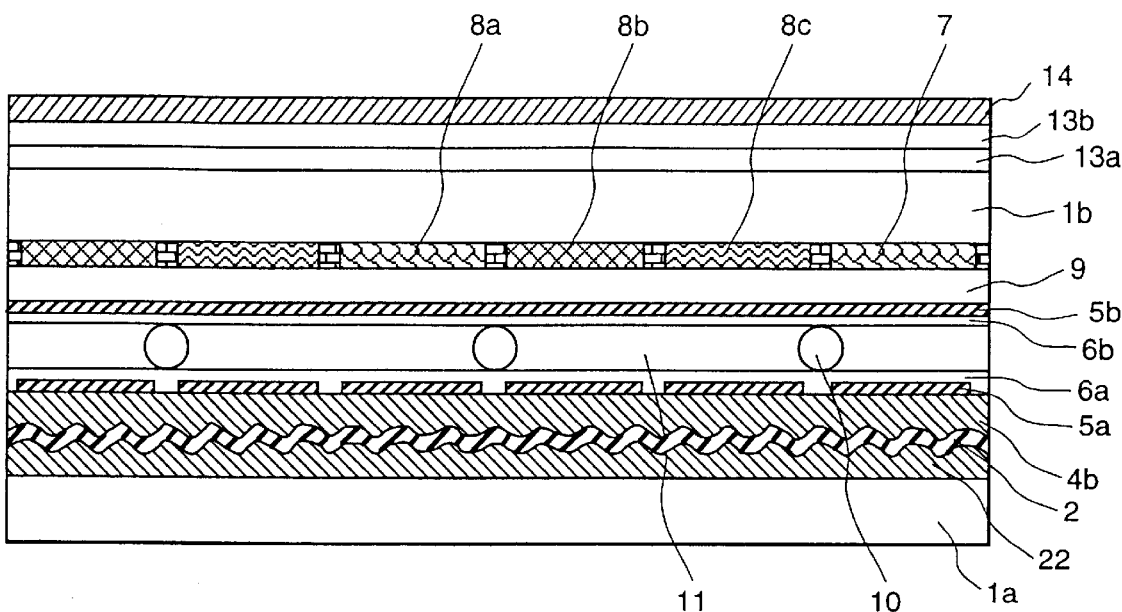
FIG. 10 is a section view of a display of a fifth portion embodiment of a reflection type liquid crystal display apparatus according to the present invention.

FIG. 10 is a section view of the display portion showing the fifth embodiment of the reflection type liquid crystal display apparatus according to the present invention.

The illustrated embodiment is formed with the reflection surface of the reflection layer 2 in the first embodiment of the reflection type liquid crystal display apparatus provided as a diffuse reflection surface having an irregularity on the reflection surface. The construction is the same as that of the first embodiment, except for the construction of respective layers formed on the substrate 1a, which will be discussed hereinafter.

On the substrate 1a, a plurality of fine ridge-like (sectionally hemisphere) resin layers 22 of 15 μm diameter and 1.2 μm height are formed over the entire surface within the region corresponding to the display portion, using photosensitive resin, thermosetting resin, acryl-type resin, epoxy type resin, imide-type resin or the like so as not to cause interference of light. The pattern of the fine ridge-like resin layer 22 may be groove-like or a combination of a groove-like and ridge-like pattern. The material, shape, size and so forth of the ridge-like resin layer may be selected according to the purpose.

In the illustrated embodiment, over the ridge-like resin layer 22, the-reflection layer 2 of aluminum is formed to a thickness of 100 nm. On the surface of the reflection layer 2, the ridge-like shape of the ridge-like resin layer 22 is reflected to form a diffuse reflection surface. On the reflection layer 2, the insulation layer 4 of 2 μm thickness is formed with the transparent resin over the entire surface of the substrate 1a to flatten the irregularity of the reflection layer 2. The insulation layer 4 is preferably formed to serve also as a flattening layer. Over the insulation layer 4, the transparent electrode 5a of 260 nm thickness formed with the ITO film is provided as a signal side electrode. Then, the orientation film 6a is formed over the entire surface within the region corresponding to the display portion. It should be noted that the surfaces of the transparent electrode 5a and the orientation layer 6a are formed to be flat.

In the illustrated embodiment, since sufficient scattering characteristics can be obtained even by the reflection layer 2, the light scattering layer can be omitted. However, the light scattering layer may be produced in a manner similar to the first embodiment.

With the illustrated embodiment, the same effect as the first embodiment can be attained. Also, since incident light from the display surface is subject to diffuse reflection, a clear display image with high resolution can be obtained.

Furthermore, in the reflection layer 2 with a diffuse reflection surface, the reflection layer per se serves as a good white diffusion plate, so as to be effective for enhancing the color purity of the color display.

Sixth Embodiment

Figure 11:
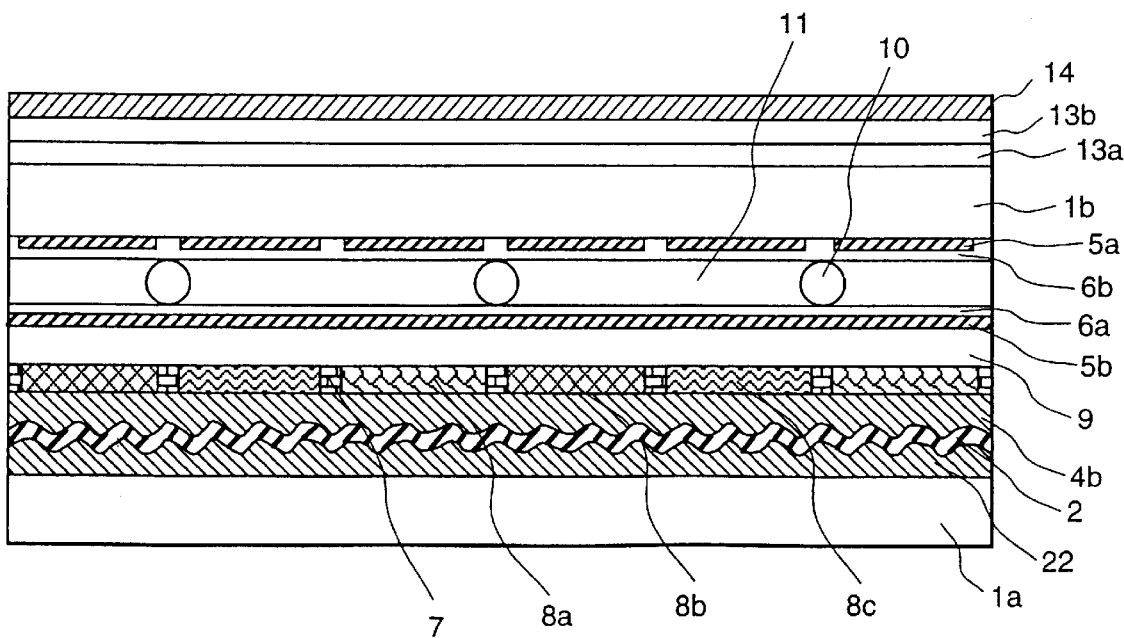
FIG. 11 is a section view of a display portion of a sixth embodiment of a reflection type liquid crystal display apparatus according to the present invention.

FIG. 11 is a section view of the display portion of a sixth embodiment of the reflection type liquid crystal display apparatus according to the present invention.

The illustrated embodiment is constructed by forming the reflection layer as a diffuse reflection layer, as in the fifth embodiment, in the third embodiment of the reflection type liquid crystal display apparatus. The construction is the same as the construction of the third embodiment, except for the construction discussed hereinafter.

The ridge-like resin layer 22, the reflection layer 2 and the insulation layer 4 are formed on the substrate 1a in sequential order similar to the fifth embodiment. The BM 7 is formed between the pixels and the peripheral portion of the display region with the resin being mixed with a black pigment. On the BM 7, the color filter 8 (red: 8a, green: 8b and blue: 8c) is formed corresponding to respective predetermined pixels. On the color filter 8, the flattening layer 9 of 2 μm thickness is formed with a transparent resin to flatten the irregularity on the surface of the color filter 8. On the flattening layer 9, the transparent electrode 5b of 260 nm thickness formed with the ITO film is provided as the scanning side electrode. The orientation film 6a is formed over the entire surf ace within the region corresponding to the display portion.

With the illustrated embodiment, a similar effect to that obtained the fifth embodiment can be obtained. Furthermore, it becomes possible to make the width of the electrode narrower, and, thus, it is possible to directly form a large number transparent electrodes serving as the signal side electrodes. Thus, connection of the TCP or correction thereof can be facilitated. Therefore, the yield in manufacturing the liquid crystal element can be improved.

Seventh Embodiment

Figure 12:
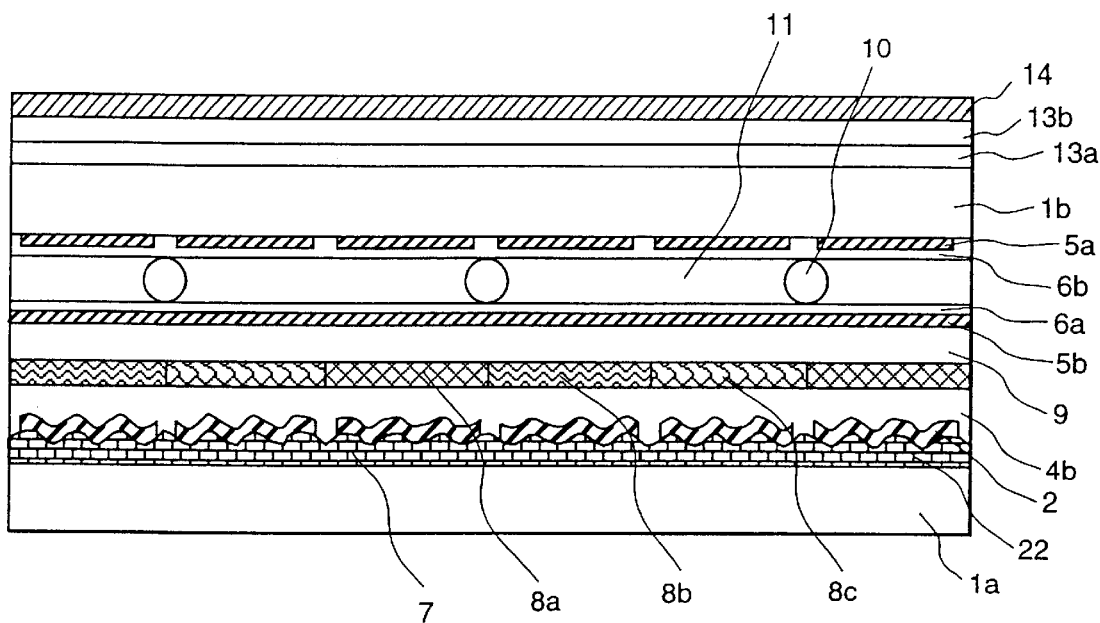
FIG. 12 is a section view of a display portion of a seventh embodiment of a reflection type liquid crystal display apparatus according to the present invention.

FIG. 12 is a section of the display portion showing the seventh embodiment of the reflection type liquid crystal display apparatus according to the present invention.

The illustrated embodiment is constructed by providing a light shielding layer formed with a plurality of fine ridge-like (sectionally hemispheric) patterns of 15 μm diameter and 1.2 μm height between the substrate 1a and the reflection layer 2, and the BM is formed with the light shielding layer exposed by removing the reflection layer in the portion between the pixels and the peripheral portion of the display region. The construction is similar to the sixth embodiment except for the construction of respective layers formed on the substrate 1a, which will be discussed hereinafter.

On the substrate 1a, a plurality of fine ridge-like (sectionally hemispheric) patterns of 15 μm diameter and 1.2 μm height are formed over the entire surface within the region corresponding to the display portion, using a photosensitive resin, thermosetting resin, acryl type resin, epoxy type resin, imide type resin or the like mixed with a black pigment so as to form a black ridge-like resin layer 22 arranged for avoiding interference of the light. The pattern of the fine ridge-like resin layer 22 may be groove-like or a combination of a groove-like and ridge-like pattern. The material, shape, size and so forth of the ridge-like resin layer may be selected according to the purpose.

In the illustrated embodiment, over the black ridge-like resin layer 22, the reflection layer of aluminum is formed to a thickness of 100 nm. On the surface of the reflection layer 2, the ridge-like shape of the ridge-like resin layer 22 is reflected to form a diffuse reflection surface. on the reflection layer 2, the insulation layer 4 of 2 μm thickness is formed with a transparent resin over the entire surface of the substrate 1a to flatten the irregularity of the reflection layer 2. Over the insulation layer 4, the transparent electrode 5a of 260 nm thickness formed with the ITO film is provided as the signal side electrode. Then, the orientation film 6a is formed over the entire surface within the region corresponding to the display portion.

With the illustrated embodiment, a similar effect to that attained in the sixth embodiment can be obtained. Since the BM 7 is formed in a precision of patterning of the reflection layer 2 of metal thin film, which has a relatively high patterning precision, the BM of black resin can be formed into a fine line.

On the other hand, in the construction of the element in the illustrated embodiment, the numerical aperture of the pixel is substantially determined by the reflection layer of the metal thin film of relatively high patterning precision and the transparent electrodes. Therefore, a high numerical aperture can be achieved to enable a high contrast display.

The insulation layer 4 also serving as the flattening layer and the flattening layer 9 on the substrate 1a employed in the illustrated embodiment may be employed arbitrarily as required. When both the insulation layer 4, also serving as the flattening layer, and the flattening layer are omitted, only the color filter is disposed between the reflection layer and the transparent electrode so as to enable a bright display with a high contrast.

Eighth Embodiment

Figure 16:
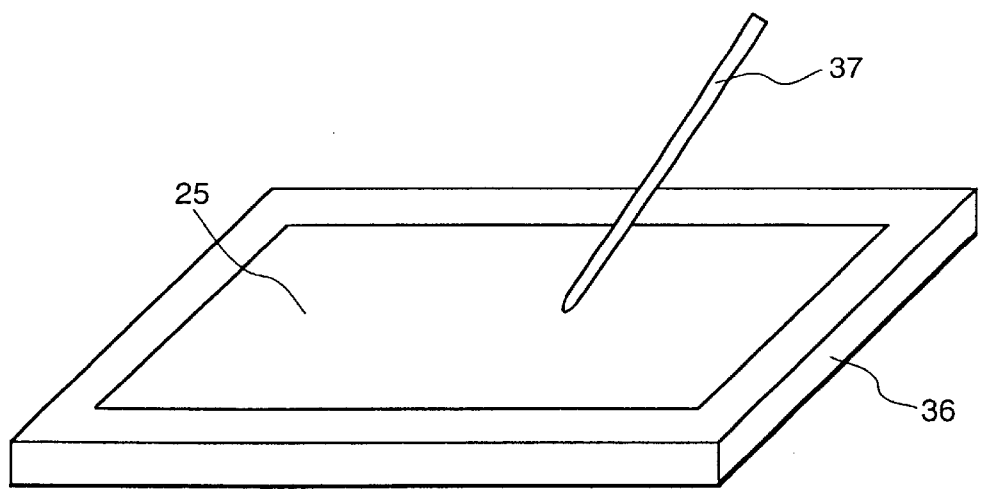
FIG. 16 is a perspective view of a portable type information processing device mounting the reflection type liquid crystal display apparatus according to the present invention.

FIG. 16 is a perspective view showing an external appearance of a portable information processing device, in which respective embodiment of the reflection type liquid crystal display apparatus are employed. The portable information processing equipment includes such devices as an electronic databook and a PDA (personal digital assistant). The illustrated embodiment of the reflection type liquid crystal display apparatus 25 is mounted as the display portion of a main body 36 having a transparent pen input device in the form of a pen 37, touch panel or the like.

Figure 17:
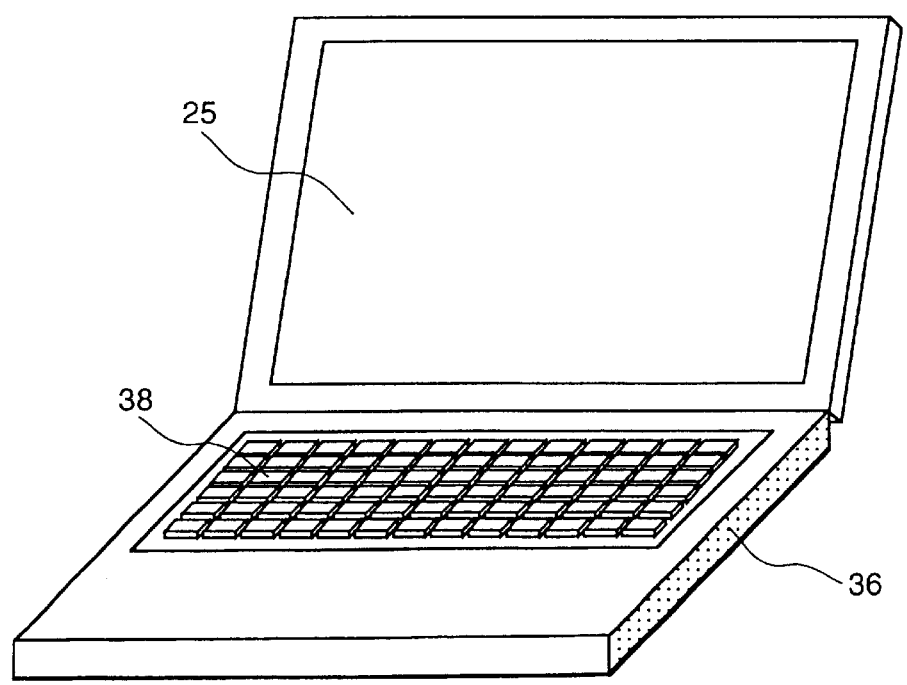
FIG. 17 is a perspective view of a note type personal computer mounting the reflection type liquid crystal display apparatus according to the present invention.

FIG. 17 is a perspective view showing an external view of a portable information processing device, in which respective embodiments of the reflection type liquid crystal display apparatus are employed. The portable information processing equipment includes such device devices as a notebook type personal computer or a workstation. The illustrated embodiment of the reflection type liquid crystal display apparatus 25 can be mounted as the display portion of the main body 36 having a keyboard 38 and so forth. Also, the illustrated embodiment of the reflection type liquid crystal display apparatus 25 can be employed as the display means of desktop type equipment.

With the illustrated embodiment, effects similar to those attained in the foregoing first to seventh embodiment can be obtained. Also, even under a bright environment, such as outdoors, a display with a high contrast can be achieved to provide superior visibility of the display.

On the other hand, since natural light or interior lighting are normally used, a dedicated light source is unnecessary, thereby to reduce the power consumption of the display portion, namely in a reflection type liquid crystal display apparatus, and, thus, the power consumption of the overall apparatus can be reduced by employing a reflection type liquid crystal display apparatus, making it possible to expand the period of use of the battery or cells.

The reflection type liquid crystal display apparatus according to the present invention is not limited to the foregoing embodiments, but is applicable for a video camera, television set, monitor, telephone, facsimile, video tape recorder, car navigation system, and the display means of a control board.

On the other hand, by providing means for illuminating the display portion from the front face or from at least one of vertical and horizontal directions, it is possible to use the device at a site where external light is not present.

With the present invention, it becomes possible to provide a reflection type liquid crystal display apparatus which can realize a display having a high color purity, high brightness and high contrast.

Although the present invention has been illustrated and described with respect to exemplary embodiments thereof, it should be understood by those skilled in the art that the foregoing and various changes, omissions and additions may be made therein and thereto, without departing from the spirit and scope of the present invention. Therefore, the present invention should not be understood as limited to the specific embodiments set out above, but to include all possible embodiments which can be embodied within a scope encompassed and equivalent thereof with respect to the features set out in the appended claims.

What is claimed is:

1. A reflection type liquid crystal display apparatus comprising:

a pair of substrates;

a pair of orientation films disposed between said pair of substrates;

a liquid crystal layer disposed between said pair of orientation films;

a plurality of electrodes disposed respectively opposing said substrates and said orientation films;

a reflection layer disposed between a plurality of said electrodes and said substrates within a space defined between one of said substrates and one of said orientation films; and at least one thin film having an insulating property arranged between said plurality of said electrodes and said reflection layer;

a first birefringent film, a second birefringent film and a polarizing film arranged outside of said pair of substrates;

said liquid crystal layer being formed of a nematic liquid crystal having a twist angle within a range of greater than or equal to 220° and smaller than or equal to 270°;

a product of anisotropy of refraction index of said liquid crystal layer and a thickness of said liquid crystal layer being greater than or equal to 0.74 $\mu$m and less than or equal to 0.82 $\mu$m, a product of anisotropy An of refraction index of said first birefringent film and a thickness thereof d being greater than or equal to 160 nm and less than or equal to 220 nm, and a product of anisotropy of said second birefringent film and a thickness thereof being greater than or equal to 370 nm and less than or equal to 470 nm; and with respect to a predetermined reference axis, an angle of an absorption axis of said polarizing film being greater than or equal to 120° and less than or equal to 170°, an angle of a lag axis of said first birefringent film being greater than or equal to 70° and less than or equal to 90°, and an angle of a lag axis of said second birefringent film being greater than or equal to 100° and less than or equal to 140°.

2. A reflection type liquid crystal display apparatus as set forth in claim 1, wherein a plurality of signal electrodes are arranged on a substrate at an end portion of the substrate.

3. A reflection type liquid crystal display apparatus as set forth in claim 1, wherein a reflection surface of said reflection layer is a mirror surface.

4. A reflection type liquid crystal display apparatus as set forth in claim 1, wherein said reflection layer is a diffuse reflection surface having an irregularity on the surface thereof, and wherein said thin film having an insulating property serves as a flattening layer.

5. A reflection type liquid crystal display apparatus as set forth in claim 1, which further comprises a color filter disposed between s substrate and an orientation film.

6. A reflection type liquid crystal display apparatus as set forth in claim 1, wherein said thin film having an insulating property is formed with at least one of a reflection enhancing film consisting of more than or equal to two and less than or equal to ten laminated dielectric films of an optical thickness of substantially one fourth wavelength, in which a dielectric film having low refraction index and a dielectric film having high refraction index are laminated alternately, a color filter, an insulation layer and a flattening layer.

7. A reflection type liquid crystal display apparatus as set forth in claim 1, which further comprises a black matrix arranged between pixels, and wherein peripheral portions of display regions within a space between a substrate and an orientation film are arranged in opposition.

8. A reflection type liquid crystal display apparatus as set forth in claim 1, wherein a condition of said polarizing film is changed as an angle of a transmission axis of said polarizing film which is greater than or equal to 120° and less than or equal to 170°.

9. A reflection type liquid crystal display apparatus as set forth in claim 1, which further comprises a light scattering layer disposed in at least one of an interlayer portion, in which said first and second birefringent films and said polarizing film are laminated.

10. A reflection type liquid crystal display apparatus as set forth in claim 9, wherein said light scattering layer is formed by laminating no more than four light scattering layers.

11. A reflection type liquid crystal display apparatus as set forth in claim 10, wherein said light scattering layer is formed by laminating light scattering layers having the same scattering characteristics.

12. A reflection type liquid crystal display apparatus as set forth in claim 10, wherein said light scattering layer is formed by laminating no more than four kinds of mutually distinct light scattering layers.

13. A reflection type liquid crystal display apparatus as set forth in claim 1, which further comprises a plurality of column like spacers for maintaining a gap for said liquid crystal layer.

14. A reflection type liquid crystal display apparatus as set forth in claim 1, wherein said at least one thin film having an insulating property is arranged between said plurality of said electrodes and said reflection layer provided on the one of said substrates so as to electrically insulate said plurality of said electrodes with respect to said reflection layer.

* * * * *